United States Patent
Jatzke

(10) Patent No.: US 9,233,652 B2
(45) Date of Patent: Jan. 12, 2016

(54) CLOSURE PLUG

(71) Applicant: TRW Automotive Electronics & Components GmbH, Radolfzell (DE)

(72) Inventor: Stefan Jatzke, Ebertsheim (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 0 days.

(21) Appl. No.: 14/529,579

(22) Filed: Oct. 31, 2014

(65) Prior Publication Data

US 2015/0135598 A1    May 21, 2015

(30) Foreign Application Priority Data

Nov. 15, 2013    (DE) .................... 10 2013 112 629

(51) Int. Cl.
| | |
|---|---|
| B60R 13/08 | (2006.01) |
| E06B 7/16 | (2006.01) |
| E06B 7/28 | (2006.01) |
| B62D 25/24 | (2006.01) |

(52) U.S. Cl.
CPC ............... *B60R 13/08* (2013.01); *B62D 25/24* (2013.01); *E06B 7/16* (2013.01); *E06B 7/28* (2013.01); *Y10S 220/19* (2013.01)

(58) Field of Classification Search
CPC ............ B60R 13/08; E06B 7/16; E06B 7/28; B62D 25/24; Y10S 220/19
USPC ........... 49/463; 220/281, 284, 260, 792, 789, 220/787, 784, 802, 804, 801; 24/458; 16/2.1–2.5
See application file for complete search history.

(56) References Cited

U.S. PATENT DOCUMENTS

| | | | | |
|---|---|---|---|---|
| 1,189,294 | A * | 7/1916 | Ruggles | 220/310.1 |
| 1,491,325 | A * | 4/1924 | Thomas, Jr. | 220/305 |
| 1,792,897 | A * | 2/1931 | De Lacy | 220/309.1 |
| 2,487,635 | A * | 11/1949 | Carpenter | 4/295 |
| 2,671,574 | A * | 3/1954 | Wolfe | 220/234 |
| 3,131,825 | A * | 5/1964 | Sarafinas | 220/234 |
| RE25,906 | E * | 11/1965 | Livingstone | 220/782 |
| 3,900,130 | A * | 8/1975 | Andrews | 220/378 |
| 4,646,932 | A | 3/1987 | Masler | |
| 4,938,378 | A * | 7/1990 | Kraus | 220/789 |
| 6,211,464 | B1 * | 4/2001 | Mochizuki et al. | 174/659 |
| 6,296,136 | B1 * | 10/2001 | Huet | 220/233 |
| 6,557,208 | B2 * | 5/2003 | Huet | 16/2.1 |
| 7,108,269 | B2 * | 9/2006 | Benkel et al. | 277/606 |
| 7,578,413 | B2 * | 8/2009 | Kraus | 220/789 |
| 8,070,008 | B2 * | 12/2011 | Janke | 220/233 |
| 8,162,166 | B2 * | 4/2012 | Nakazato | 220/359.4 |
| 8,371,789 | B2 * | 2/2013 | Takita | 411/508 |
| 8,672,178 | B2 * | 3/2014 | Siragusa | 220/789 |
| 2005/0000973 | A1 | 1/2005 | Sbongk | |
| 2005/0269330 | A1 * | 12/2005 | Baughman | 220/288 |

FOREIGN PATENT DOCUMENTS

| | | |
|---|---|---|
| DE | 3512582 | 10/1986 |
| DE | 10253983 | 6/2004 |

* cited by examiner

*Primary Examiner* — Katherine Mitchell
*Assistant Examiner* — Justin Rephann
(74) *Attorney, Agent, or Firm* — Tarolli, Sundheim, Covell & Tummino LLP

(57) ABSTRACT

A closure plug for closing an opening has an annular sealing section which is provided to rest against an edge of the opening, and an expansion section which is formed in one piece with the sealing section and can be adjusted from a mounting position, in which the sealing section has a mounting diameter at least at one axial end, to an expansion position, in which the sealing section has a larger diameter.

14 Claims, 4 Drawing Sheets

CLOSURE PLUG

The invention relates to a closure plug for closing an opening, in particular in a vehicle body.

BACKGROUND OF THE INVENTION

In vehicle body construction a multitude of openings and holes are produced, which would permit an ingress of moisture and dirt. Also, such openings and holes constitute so-called sound bridges. Therefore, these openings and holes are closed with closure plugs. The aim is to seal the openings and holes and, in addition, to bring about a sound damping.

Closure plugs are made use of for closing these vehicle body openings. In this connection, a large number of plug geometries are already known.

DE 102 53 983 A1, for example, shows a closure plug for sealing and sound-damping closure of a hole in a component. The closure plug has an annular sealing section which is compressed when the closure plug is inserted into the opening, and sealingly engages the edge of the opening.

In the known solutions it has turned out to be a drawback that the mounting of the closure plugs in openings of the vehicle body requires high mounting forces.

It is therefore the object of the present invention to reduce the forces required for mounting a closure plug and also to solve the tightness problems, known from the prior art, of known closure plugs.

BRIEF DESCRIPTION OF THE INVENTION

In view of the above object, a closure plug is provided for closing an opening, which includes an annular sealing section adapted to rest against an edge of the opening. The closure plug further has an expansion section which is formed in one piece with the sealing section and can be adjusted from a mounting position, in which the sealing section has a mounting diameter at least at one axial end, to an expansion position, in which the sealing section has a larger diameter, the sealing section being axially biased outwardly by transferring the expansion section from the mounting position into the expansion position. The invention is based on the fundamental idea of using a plug which when in the mounting position can be inserted with low force into the opening of the vehicle body and can then, by applying pressure to a portion of the plug in the mounting direction, be adjusted to an expansion position, in which the plug reliably seals against the edge of the opening. The circumstance that the sealing section of the closure plug initially has a mounting diameter which is smaller than the diameter of the sealing section when in the expansion position allows the closure plug to be inserted into the opening in a simple manner. Depending on the dimensions, this can be effected completely or at least almost without friction. When the closure plug has been inserted, the expansion section is adjusted from the mounting position to the expansion position, so that the sealing section is pushed outward and its diameter increases. In this way, the sealing section sealingly engages the edge of the opening into which the closure plug has been inserted. The closure plug is thus fixed in place in the opening by axial pressure being redirected so as to obtain a radial deformation. It is particularly advantageous that the direction in which the expansion section is pushed in and the direction of insertion of the closure plug are identical. The configuration of the closure plug according to the invention also allows the sealing section to engage the edge of the opening or the inner surface of the opening even with different sheet metal thicknesses. It is especially advantageous that the closure plug can be inserted into the opening with low mounting force. At the same time, the adjustment to the expansion position allows the sealing section to sealingly rest against the edge or the inner sides of the opening, and a good sealing effect can be achieved in this way. In addition, the closure plug has a sound damping effect.

Preferably, provision is made that the expansion section is connected to the sealing section by means of a folding section. The folding section allows an axial displacement of the expansion section to be converted to a radial expansion motion in a very simple way in terms of design. In addition, the expansion behavior of the expansion section can be adjusted by means of the folding section. The expansion section is transferred from the mounting position to the expansion position by folding the folding section. Furthermore, in this way the closure plug is permanently fixed in place in the expansion position because in the expansion position the folding section is folded. In addition, the folding increases the stability of the closure plug.

Furthermore, it is conceivable that when the expansion section is in the mounting position, the folding section includes at least two stepped cylinder sections. The cylinder sections produce a defined folding behavior. It is, for example, conceivable that the folding of the folding section is effected between the two stepped cylinder sections.

It is further possible that when the expansion section is in the expansion position, the folding section runs in a meander shape when viewed in section. The meander-shaped course allows a particularly stable shape and folding of the folding section in the expansion position.

Provision may further be made that the folding section is connected to the sealing section at the axial end thereof which has the mounting diameter when the expansion section is in the mounting position.

It is furthermore conceivable that the expansion section has a disk-shaped design. This simple geometry allows a shape of the closure plug which is stable but, at the same time, simple to manufacture.

In addition, the expansion section may have a diameter that is larger than half the inside diameter of the sealing section. Such a configuration enhances the expansion behavior of the closure plug since the deformation of the expansion section occurs in the region between the expansion section and the sealing section and thus in a narrowly defined region of the closure plug. Also, an expansion section that is comparatively large in size offers a large engagement surface during mounting, so that the expansion section can be readily pushed from the mounting position to the expansion position.

Provision may be made furthermore that the sealing section includes a surrounding locking edge at its axial end which has the mounting diameter when the expansion section is in the mounting position. The surrounding locking edge allows the closure plug to be securely prefixed in the opening to be closed, even before the expansion section has been brought to the expansion position.

Preferably, provision is made that the sealing section includes a surrounding sealing lip at the axial end opposite the axial end that can be widened by means of the expansion section. This may enhance and improve the sealing effect of the closure plug. The sealing lip may be arranged at an angle to the sealing section and may be directed or oriented toward that axial end which can be widened by means of the expansion section. In this way, a prestress can be automatically applied to the sealing lip when the plug is inserted, as a result of which the sealing effect is increased.

Moreover, it is preferably provided that the closure plug is in the form of a one-piece injection molded part. This allows a cost-effective production of the closure plug even for high numbers of units.

BRIEF DESCRIPTION OF THE DRAWINGS

Further features and advantages of the invention will be apparent from the description below and from the accompanying drawings, to which reference is made and in which.

DETAILED DESCRIPTION OF THE INVENTION

Figure 1:
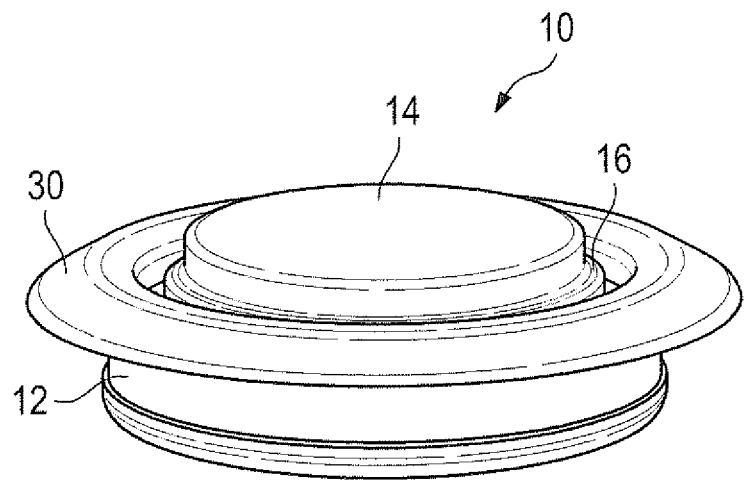
FIG. 1 shows a perspective view at an angle from above of an exemplary embodiment of a closure plug according to the invention.

FIG. 1 shows a perspective view, at an angle from above, of an exemplary embodiment of a closure plug 10 according to the invention, which is in the form of a one-piece injection molded part. The closure plug is formed of a plastic material.

The closure plug 10 includes, as its main components, an annular sealing section 12, an expansion section 14 and a folding section 16.

The sealing section 12 and the expansion section 14 are integrally connected with each other by the folding section 16.

The sealing section 12 includes a surrounding locking edge 22 and a bevel 24 at its axial end 20 at which it is connected with the folding section 16. The locking edge 22 is adjoined by a surrounding support surface 26 which is then adjoined by a surrounding sealing lip 30 at the other axial end 28.

The sealing lip 30 is arranged at an angle to the sealing section 12 and is oriented toward the axial end at which the expansion section 14 is connected with the sealing section 12.

Figure 2:
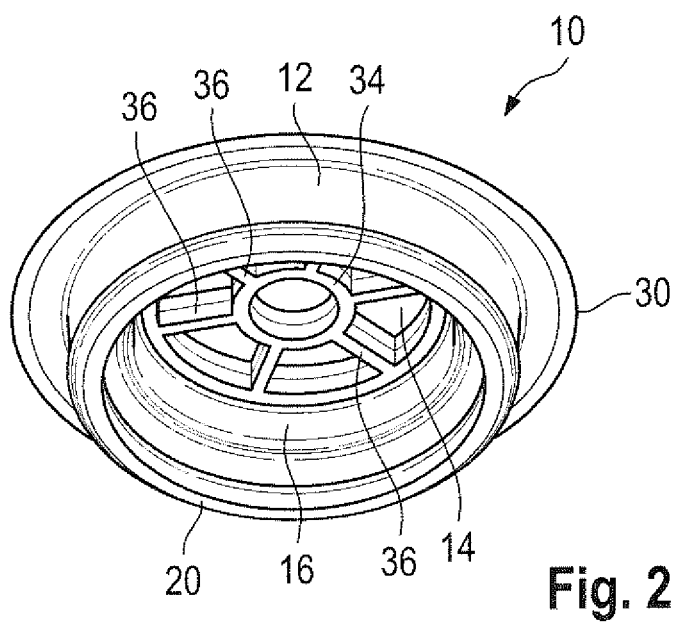
FIG. 2 shows a perspective bottom view of the closure plug according to FIG. 1.
Figure 3:
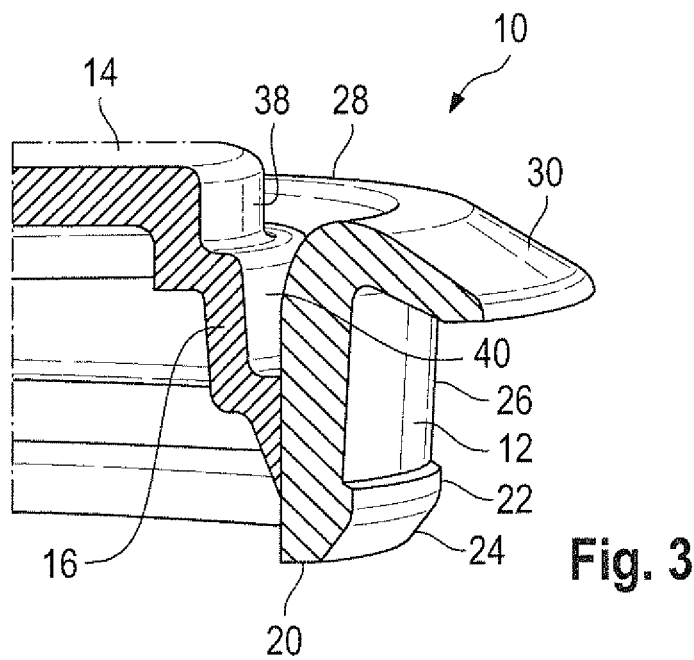
FIG. 3 shows a perspective sectional illustration of the closure plug according to FIG. 1.

The support surface 26 is, in the broadest sense, cylindrical, with the sealing section 12 being slightly conical in the condition of the sealing plug as illustrated in FIGS. 1 to 3; the diameter at the end facing the sealing lip 30 is slightly larger than that at the end provided with the locking edge 22.

The expansion section 14 is configured in the nature of a circular disk having a diameter that is larger than half the inside diameter of the sealing section 12. Except for some room for the folding section 16, the expansion section takes up the entire interior space inside the sealing section 12.

The expansion section 14 is flat on one side and provided with reinforcing elements 32 on the other side. The reinforcing elements 32 reinforce and stiffen the expansion section 14.

The reinforcing elements 32 are provided here in the form of a reinforcing ring 34 and reinforcing ribs 36.

The reinforcing elements are arranged on that side of the expansion section that faces the axial end of the sealing ring 12 provided with the locking edge 22.

The folding section 16 connects the expansion section 14 with the sealing section 12, more specifically the outer circumference of the expansion section 14 with the inside of that axial end of the sealing section which has the smaller diameter in the initial condition shown in FIGS. 1 to 3, that is, with the axial end provided with the locking edge. It has two stepped cylinder sections 38, 40 here, the diameter of the cylinder section 38 connected with the expansion section 14 being smaller than the diameter of the cylinder section 40 connected with the sealing section 12.

Figure 4:
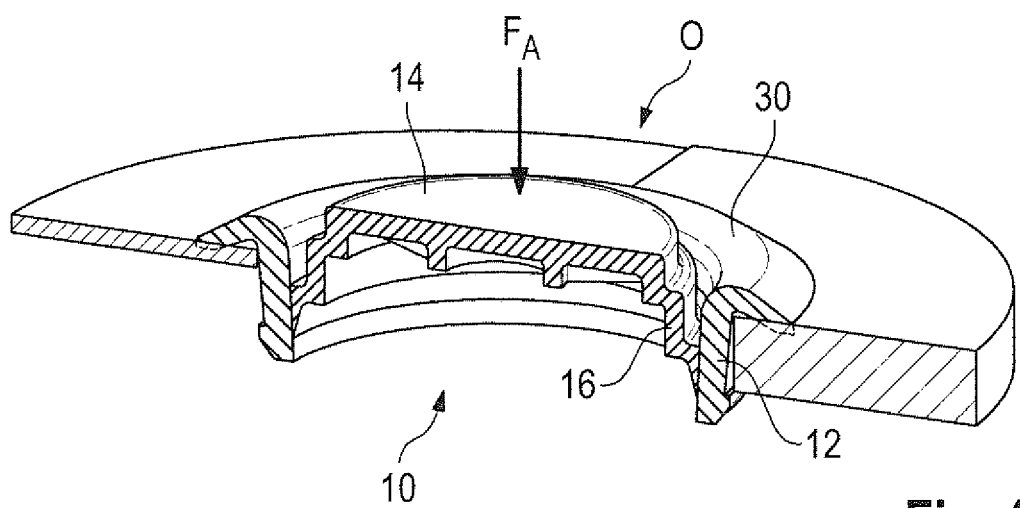
FIG. 4 shows a further perspective sectional illustration of the closure plug according to FIG. 1 in the mounting position, inserted in an opening of a vehicle body.
Figure 5:
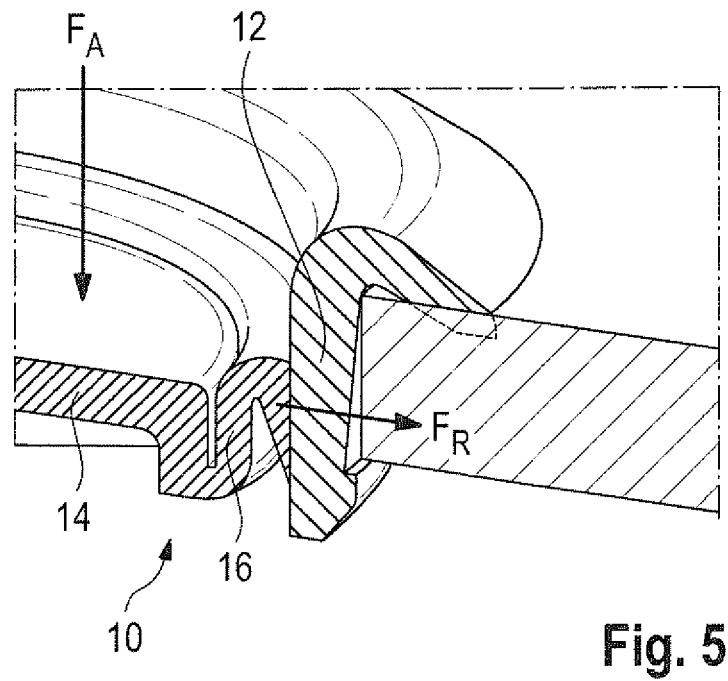
FIG. 5 shows a further perspective detailed sectional illustration of the closure plug according to FIG. 1 in the expansion position, inserted in an opening in a vehicle body.
Figure 6:
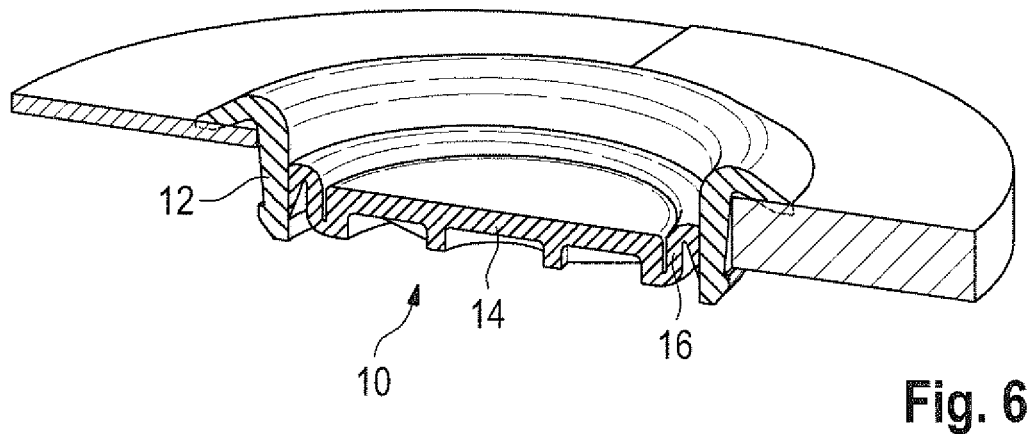
FIG. 6 shows a further perspective sectional illustration of the closure plug according to FIG. 1 in the expansion position, inserted in an opening of a vehicle body.
Figure 7:
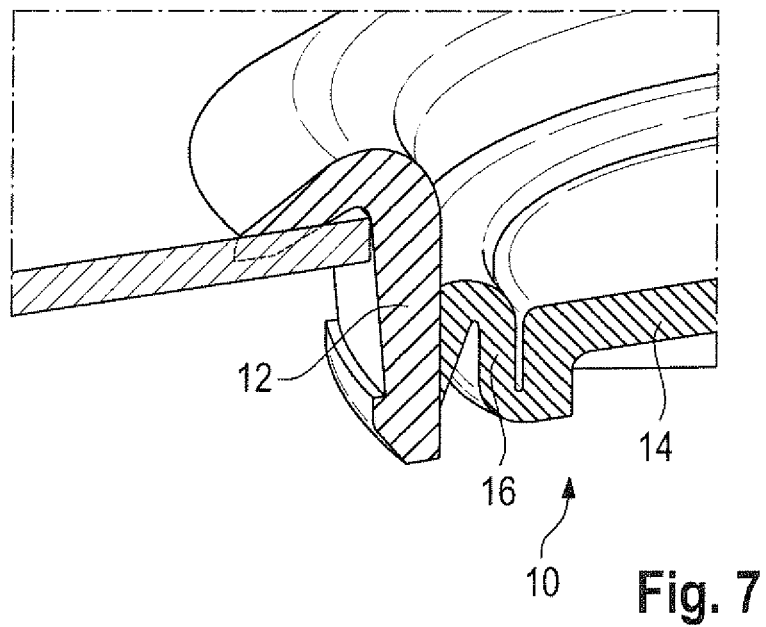
FIG. 7 shows a further perspective detailed sectional illustration of the closure plug according to FIG. 1 in the expansion position.

The closure plug 10 can assume two states, namely a non-locked state in the mounting position, as is illustrated in FIGS. 1 to 4, and a locked state in the expansion position, as is illustrated in FIGS. 5 to 7.

The transition from the mounting position to the expansion position occurs in that the expansion section 14 is adjustable from a mounting position, in which the sealing section 12 has a mounting diameter at least at one axial end, to an expansion position, in which the sealing section 12 has a larger diameter.

The diameter of the sealing section 12 is enlarged in that in the expansion position, the expansion section 14 and the folding section 16 press the sealing section 12 radially outwards. As a result of this, the sealing section 12 can engage the inside of the opening, so that the closure plug 10 is reliably clamped within the opening and is firmly held there.

The expansion section 14 has a diameter that is larger than half the inside diameter of the sealing section 12.

With reference to FIGS. 4 to 7, it will now be explained below how the closure plug 10 is fixed in place within an opening O.

The closure plug 10 is inserted into the opening O when in its mounting position. The expansion section 14 has not yet been pushed in here, so that it lies above the sealing lip 30.

Here, the opening O to be closed is an opening O of a vehicle body.

Due to the circumstance that the sealing section 12 of the closure plug 10 initially has a mounting diameter which is smaller than the diameter of the sealing section 12 when in the expansion position, the closure plug 10 can be inserted into the opening O without great effort.

Once the closure plug 10 has been inserted in the opening, the expansion section 14 is adjusted from the mounting position to the expansion position by simply pushing the expansion section 14 in (cf. FIGS. 4 and 5). This is effected with an axial force $F_A$, which is oriented in the direction of the axial direction of the closure plug 10. In the process, the folding section 16 is folded, so that the two cylinder sections 38, 40, which in the initial or mounting condition lie one behind the other in the axial direction, now lie radially side by side on the same level. The cylinder sections 38, 40 are dimensioned such that when they are positioned side by side, they exert a radial expansion force or radial force $F_R$ on the sealing section 12, more precisely on the lower axial end in the Figures. This causes the end of the sealing section 12 provided with the locking edge 22 to be widened outwards, so that the sealing section 12 is pressed against the edge of the opening O.

The expansion position is shown in FIG. 5, which shows a sectional illustration of the closure plug 10 in the expansion position.

When the expansion section 14 is pushed in, the sealing section 12 is pressed outward and its diameter is enlarged. The sealing section 12 sealingly engages the edge of the opening O into which the closure plug has been inserted.

As is apparent from FIGS. 5 to 7, as viewed in section, the folding section 16 runs in a meander shape when the expansion section 14 is in the expansion position.

Owing to the folding of the folding section 16 which, in section, has a meander shape when in the expansion position, the closure plug 10 is reliably fixed in this position. That part of the folding section 16 which adjoins the expansion section 14 presses that part of the folding section 16 outward which adjoins the sealing section 12. In addition, the meander-shaped folding of the folding section 16 has the advantage that it is dimensionally stable.

The closure plug 10 is thus fixed in place in the opening O by the redirection of axial pressure to obtain a radial deformation. It is particularly advantageous that the direction in which the expansion section 14 is pushed in is the same as the insertion direction of the closure plug 10. As a result, the closure plug 10 can be inserted into and fixed in place in the opening O with one single movement.

The configuration according to the invention of the closure plug 10 further allows the sealing section 12 to rest against the edge of the opening or the inner surface of the opening even with different sheet metal thicknesses.

The invention claimed is:

1. A closure plug for closing an opening in a vehicle body, comprising an annular sealing section which is provided to rest against an edge of said opening, and an expansion section which is connected to said sealing section by means of a folding section and which is formed in one piece with said sealing section and can be adjusted from a mounting position, in which said folding section includes at least two cylinder sections with different external diameters which lie one behind the other in the axial direction, and in which said sealing section has a mounting diameter at an axial end of said sealing section, to an expansion position in which the two cylinder sections lie radially side by side on the same level and exert a radial force on the sealing section and in which said sealing section has an expansion diameter at the axial end of said sealing section, said expansion diameter being larger than said mounting diameter, said sealing section being axially biased outwardly by transferring said expansion section from said mounting position into said expansion position.

2. The closure plug of claim 1 wherein said folding section is connected to said sealing section at said axial end thereof, wherein said axial end of said sealing section has said mounting diameter when said expansion section is in said mounting position.

3. The closure plug of claim 1 wherein said expansion section has a substantially flat and circular disk-shaped design.

4. The closure plug of claim 1 wherein said expansion section has a diameter that is larger than half of an inside diameter of said sealing section when said expansion section is in said mounting position and said sealing section has said mounting diameter.

5. The closure plug of claim 1 wherein said sealing section includes a surrounding locking edge at said axial end thereof, said axial end having said mounting diameter when said expansion section is in said mounting position.

6. The closure plug of claim 1 wherein said sealing section includes a surrounding sealing lip at a second axial end opposite said axial end that can be widened by means of said expansion section.

7. The closure plug of claim 1 wherein said closure plug is a one-piece injection molded part.

8. A closure plug for closing an opening in a vehicle body, comprising:
an annular sealing section configured to rest against an edge of the opening;
an expansion section formed integrally with the sealing section and being adjustable from a mounting position to an expansion position, an axial end of the sealing section having a mounting diameter when the expansion section is in the mounting position and an expansion diameter when the expansion section is in the expansion position, the expansion diameter being larger than the mounting diameter, the sealing section being biased radially outward when the expansion section is transferred from the mounting position to the expansion position; and
a folding section connecting the expansion section to the sealing section, the folding section including a first cylindrical section and a second cylindrical section coaxial with the first cylindrical section, the second cylindrical section being located behind the first cylindrical section in a direction along a longitudinal axis of the closure plug when the expansion section is in the mounting position, the first cylindrical section and the second cylindrical section being concentric and configured to exert a radial force on the sealing section when the expansion section is in the expansion position.

9. The closure plug of claim 8 wherein the folding section is connected to the axial end of the sealing section.

10. The closure plug of claim 8, wherein the expansion section has a substantially flat and circular disk-shaped design.

11. The closure plug of claim 8, wherein the expansion section has an outer diameter and the sealing section has an inner diameter, the outer diameter of the sealing section being larger than half of the inside diameter of the sealing section when the sealing section is in the mounting position.

12. The closure plug of claim 8, wherein a locking edge is provided at the axial end of the sealing section.

13. The closure plug of claim 8, wherein the sealing section includes a sealing lip at a second axial end opposite the axial end, the expansion section being capable of widening the sealing lip.

14. The closure plug of claim 8, wherein the closure plug is manufactured as a one-piece injection molded part.

* * * * *